May 9, 1961 G. R. NAAS 2,983,121
TORQUE CONTROL MEANS
Filed Nov. 27, 1957 2 Sheets-Sheet 1

May 9, 1961 G. R. NAAS 2,983,121
TORQUE CONTROL MEANS
Filed Nov. 27, 1957 2 Sheets-Sheet 2

United States Patent Office 2,983,121
Patented May 9, 1961

2,983,121
TORQUE CONTROL MEANS
George R. Naas, 11 Caledonia Ave., Scottsville, N.Y.
Filed Nov. 27, 1957, Ser. No. 699,394
5 Claims. (Cl. 64—29)

This invention relates to torque control means useful especially, although not exclusively, in hand tools such as screwdrivers and wrenches, and useful also to control or limit the extent of torque force transmitted from one shaft to another, in machinery shafting, control knobs of instruments, etc.

In such hand tools, as well as in rotary tools of other kinds and in machinery shafting, control knob shafts, etc., there is a problem involved in providing a reliable torque controlled clutch mechanism which will release or let go at a predetermined torque for which it is set, even after long continued use.

An object of the present invention is the provision of torque control means of simple and effective character, easy and inexpensive to manufacture, and reliable in use.

Another object is the provision of such torque control means of such compact size that it can be easily incorporated in relatively small hand tools or in the shafting of relatively small machines or instruments, without adding substantially to the bulk or weight thereof.

A further object is the provision of torque control means which meets the above mentioned qualifications and which, in addition, is adjustable to vary the torque at which the parts will release.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
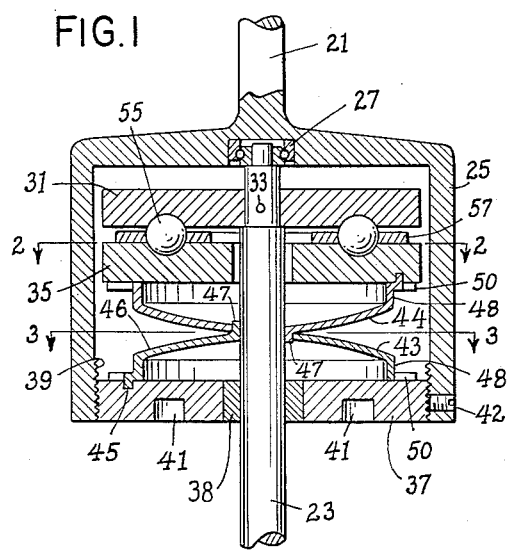
Fig. 1 is a longitudinal section taken diametrically through control means in accordance with a first embodiment of the invention.

Torque tools have become quite popular in recent years. As well understood by those familiar with such tools, it is frequently desirable to tighten a screw, nut, or other rotary member to a certain predetermined degree of torque, in order to make the fastening sufficiently tight and at the same time not injure the parts by tightening too much. Frequently, also, the turning of a fastening member to a particular degree of torque is desirable when the fastening member is one of a series of similar fastening members, all of which should be tightened to the same degree of torque, in order to obtain uniform pressure or uniform action of various parts.

In order to accomplish this, the driving end of the tool (e.g., the handle end of a screwdriver or wrench, or the power operated end of a power tool) should be rotatable relatively to the driven end of the tool (e.g., the screwdriver bit, socket wrench, or other part which engages the screw, bolt, nut, or other member to be turned) and should be connected thereto by torque control means in the nature of a clutch which will release or let go when the predetermined degree or rotary force or torque is reached. It is to this torque control means or clutch that the present invention relates regardless of the particular form of the handle or other driving end of the tool, or the particular form of the screwdriver bit, socket wrench, or other driven end of the tool. Although the invention will be specifically described in connection with a screwdriver, wrench, or similar hand tool, it should be understood that the structure provides, in effect, a torque-controlled releasable clutch, not limited in its usefulness to a hand tool, and it may be used on the shaft of a control knob of an instrument, or on any machinery shafting where it is desired to limit the torque which can be transmitted from a driving shaft to a driven shaft axially alined therewith.

Referring now to the first embodiment as illustrated in Figs. 1–4 of the drawings, this embodies a shank 21 which constitutes part of the driving end of the tool or end to which driving force is applied either manually by hand, or by power means. Alined with the shank 21 is a second shank 23 which is part of the driven end of the tool and which is formed with a screwdriver bit, socket wrench, snap-on shank, or the like.

The shank 21 is formed with an annular cup-shaped flange 25 which contains the torque control means or clutch mechanism. The upper end of the shank 23 is centered relative to the shank 21 and housing 25 and held by means of a suitable bearing 27, which may be a miniature ball bearing of the thrust type.

Within the cup-shaped housing 25 a radially extending disk 31 is pinned by a pin 33 to the shank 23, to turn therewith. Below this disk 31 is a second and somewhat similar disk 35 which, however, is not directly connected to the shank 23, but has a central opening allowing some clearance around the shank 23 so that the latter may turn relative to the disk 35. Spaced some distance below the disk 35, in a direction axially of the shank 23, is a disk 37, the outer edge of which is screw threaded to mate with screw threads 39 on the housing 25, the outer or lower face of the disk 37 being provided with sockets 41 for receiving a spanner wrench for turning the disk 37 relative to the housing 25 to adjust the disk along the screw threads 39. A radial setscrew 42 holds the disk 37 in any position to which it is adjusted. The disk 37 has a bearing 38 for the shank 23.

A pair of Belville springs 43 and 44 are interposed between he disks 35 and 37. It has been found that Belville springs of the type heretofore known, comprising a dished disk of spring metal, and having peripheral notches, tend to develop radial cracks adjacent to the notches under repeated flexure. For this reason, the springs 43 and 44 comprise disks of spring metal having a dished portion 46, containing a central opening for passage of the shaft 23, a cylindrical flange portion 48 at the outer edge of the dished portion, and a radial flange 50 at the outer edge of the cylindrical portion. The cylindrical portion 48 distributes the forces evenly to the dished portion 46, and prevents cracks from forming as a result of flexure. The outer edge of the radial flange is formed with alternating downwardly bent ears or tabs 45, and notches 52. The inner portion of each of the springs 43 and 44, surrounding the central hole is also formed with alternating ears or tabs 47, and notches 54 which receive the ears of the adjacent spring. The notches and tabs on the springs are arranged to interlock with each other, so that any number of springs may be stacked, and so that torque applied to any one spring in the stack will be transmitted to all the other springs in the stack. In the construction shown in Fig. 1, only two springs are illustrated, with their convex surfaces faced toward each other. However, more springs can be stacked together in axial alinement with each other, if desired. If two springs are stacked with their concave faces toward each other, the tabs or ears 45 of each spring will extend into the notches 52 of the adjacent spring, thus locking two adjacent springs in non-rotary or torque-transmitting relation to each other when they are back to back, just as is done by the ears 47 engaging in notches 54 when the springs are face to face (i.e., with convex surfaces toward each other.)

The tabs or ears 45 of the lowermost spring 43 extend into openings in the disk 37, and those of the upper spring 44 extend into similar openings in the disk 35, thereby locking the springs 43 and 44 firmly to their respective disks and preventing relative rotation thereof. Thus, the springs 43 and 44 are adapted to transmit torque from the disk 37 to the disk 35, and at the same time tend to resiliently force the disk 35 in an upward direction toward the disk 31. It is to be understood that while this embodiment has been described as having only two springs, any number could be employed, since torque is transmitted from one to the other, as described above.

Figure 2:
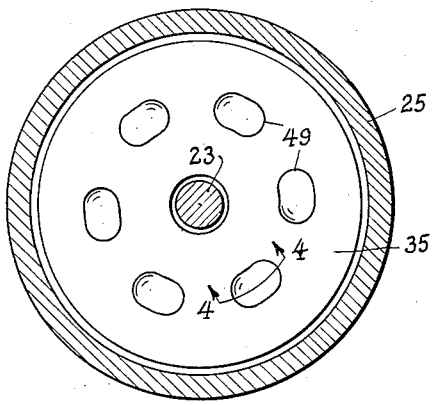
Fig. 2 is a cross section through the same taken substantially on the line 2—2 of Fig. 1.
Figure 4:
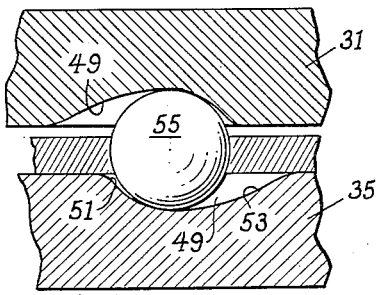
Fig. 4 is an arcuate section taken approximately on the line 4—4 of Fig. 2.
Figure 3:
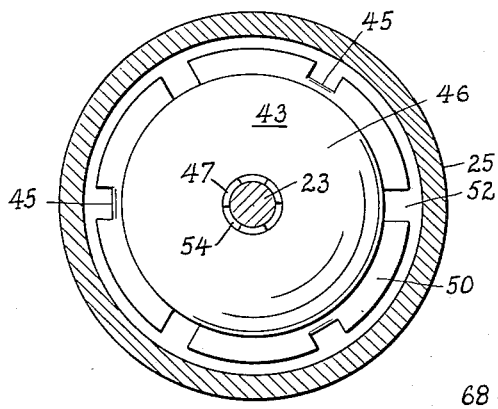
Fig. 3 is a cross section taken substantially on the line 3—3 of Fig. 1.

The lower surface of the disk 31 and upper surface of the disk 35 contain a plurality of indentations 49 arranged in a circular pattern concentric with the shank 23. The indentations 49 are somewhat elongated in a circumferential direction as shown in Figs. 2 and 4, and have a relatively steep shoulder on one end thereof as shown at 51, and a relatively gradual slope on the other end thereof as shown at 53 in Fig. 4, for purposes hereinafter to be described.

A plurality of balls 55 is interposed between the disks 31 and 35. Preferably there is the same number of balls as the number of indentations 49 in each of the disks 31 and 35, six of each being shown by way of example. The balls 55 are maintained in radial and circumferential orientation by a perforated cage ring 57. The balls 55 extend into the corresponding indentations 49 in the disks 31 and 35, respectively.

In operation, a torque is applied to the shank 21, which transmits it to the attached casing 25. Since the disk 37 is maintained in its position relative to the casing 25 by means of a setscrew 42, the torque will also be transmitted to the disk 37. The spring 43, being non-rotatably attached to the disk 37 by means of the tabs 45, will transmit the torque to the spring 44 by means of the tabs 47; and the spring 44 will in turn, transmit the same to the disk 35. Thus, rotation of the shank 21 causes corresponding rotation of the case 25, the disk 37, the springs 43 and 44, and the disk 35.

The rotation of the disk 35 causes the shoulders 51 of the indentations 49 to engage the balls 55 causing them to move in a circular path. This movement of the balls 55 causes them to engage the shoulders 51 of the indentations 49 in the disk 31, causing the latter to rotate at the same rate as the disk 35. Since the disk 31 is pinned to the shank 23 by means of the pin 33, this also causes the shank 23 to rotate in unison with the disk 35, and the torque is thus transmitted from the shank 21 to the shank 23.

However, should the tool attached to the shank 23 offer great resistance to rotation, this resistance is transmitted through the shank 23 to the disk 31. Should the torque applied to the disk 35 be increased to overcome this resistance, the balls 55 will tend to cam the disk 35 axially away from the disk 31 against the urging of the springs 44 and 45, and the balls will then leave the indentations 49 and will roll into the space between the flat face portions of the two disks.

As soon as the balls are out of the indentations 49, there is no means to transmit the torque from the plate 35 to the plate 31, and the clutch is disengaged, relieving the overload forces. However, when relative rotation of the disks 31 and 35 brings the balls 55 to the next indentations, the balls fall into these indentations and the disk 35 moves upwardly under the urging of the springs 43 and 44. The balls now abut the shoulders 51 of the indentations 49 in the respective disks, and again attempt to transmit the torque to the plate 35 and the disk 31. Should the torque still be excessive, the balls will again force the disk 35 downwardly and will roll out of the indentations, as described above. This process will be repeated until the torque is relieved and falls below the critical point wherein camming force exerted by the balls is insufficient to force the plate 35 away from the plate 31. When this occurs, the balls will remain within their indentations and continue to transmit the torque from the plate 35 to the plate 31 and thence to the shank 23.

When the clutch is disengaged by overload, the balls may leave the recesses in both plates, or frequently they may remain in the recesses of one plate and leave only the recesses of the other plate. In either case, a disconnection results. The same remarks apply to the other embodiments of the invention, to be described hereafter.

Since the axial movement of the disk 35 is resiliently opposed by the upward force of the springs 43 and 44, the torque required to cause this movement depends on the strength of the springs. The greater the upward force exerted by springs 43 and 44, the greater the torque required to force the balls 55 from indentations 49. Thus, the critical torque at which the clutch releases may be controlled by varying the force exerted by the springs 43. This can be conveniently accomplished by removing the setscrew 42, and moving the plate 37 longitudinally either upwardly or downwardly by means of a spanner wrench engaging the sockets 41. Upward movement of the plate 37 compresses the springs 43 and 44 and increases the amount of torque that will be transmitted before the clutch automatically disconnects itself; downward movement of the plate 37 has the reverse effect.

It has been found that by using the springs 43 and 44 for the double purpose of transmitting the torque and for applying axial force to the plate 35, uniform operation of the clutch is assured. This method of transmitting the torque to the plate 35 eliminates the need for frictionally engaging parts between the plate 35 and any other portion of the clutch mechanism which could bind or otherwise interfere with the movement of the plate 35. Thus the plate 35 is completely free to move in an axial direction in order to disengage the clutch rapidly and smoothly when the predetermined torque is exceeded.

The provision of the circumferentially elongated indentations 49 having gradual entrance curves 53 provides smooth engagement of the clutch. The balls 55 roll easily into the indentations 49 down the gentle slopes 53, allowing the plate 35 to move into place smoothly under the urging of the springs 43 and 44, reducing the impact of the balls 55 against the torque transmitting shoulders 51 to a minimum. This is desirable, since such impact of the balls against the shoulders 51 might transmit torque greater than the predetermined maximum, which would defeat the purpose of the torque limiting mechanism.

The shoulders 51 are comparatively steep in order to provide for the transmission of torque. However, the radii of the shoulders 51 are slightly greater than the radii of the balls 55 as shown in Fig. 4, in order to provide a smooth path for the balls and assure smooth, uniform release of the clutch. Thus a clutch embodying these features combines remarkably uniform release action coupled with a smooth re-engagement action.

Figure 5:
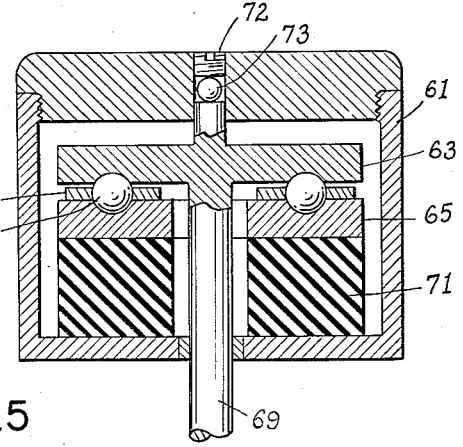
Fig. 5 is a view similar in general to Fig. 1, showing a second embodiment of the invention.

A second embodiment of this invention is illustrated in Fig. 5. This embodiment includes a case 61, adapted to be attached to a driving means or itself constituting a driving handle to be grasped by the fingers. The case contains a pair of indented plates 63 and 65, similar to the plates 31 and 35 in the first embodiment, and a plurality of balls 67 which serve the same function as the balls 55 described above, which balls are held properly spaced by a cage ring 68. The plate 63 is rigidly connected to a shank 69 which is attached to the member to be driven. It is immaterial whether the plate or disk 63 is integral with the shank 69, or whether it is a separate member pinned or otherwise fixed to the shank. These same remarks apply to the corresponding parts in all other described embodiments of the invention.

A resilient cushion 71 formed of a soft, pliable material, such as rubber, is fastened to the bottom of the case 61 and to the bottom surface of the plate 65. The cushion 71 serves to resiliently force the plate 65 upwardly, and at the same time to transmit the torque from the case 61 to the plate 65 whence it is transmitted by the balls 67 to the plate 63, and thence through the shank 69 to the tool to be driven. The operation of this embodiment is similar to the operation of the first described embodiment, with the resilient cushion 71 fulfilling the functions of the springs 43 and 44 in the first embodiment. If desired, a setscrew 72 may be provided for axial adjustment of the shank 69, in order to control the degree of compression of the cushion 71, in order to vary the torque at which the clutch disengages. The setscrew engages a ball 73 which serves as a thrust bearing for the upper end of the shank 69. If the shaft 69 and disk 63 are of steel, the bearing ball 73 is preferably of bronze or brass.

This embodiment has the advantages of the first embodiment in that the movable plate 65 is not attached directly to the case 61 but is anchored to it only through the torque-transmitting resilient member 71, and thus axial movement of the plate 65 during the early part of a releasing operation does not cause any rubbing or friction between the plate and the case, which would be likely to make the release uncertain or variable. This construction results in extremely smooth and reliable functioning of this clutch, as described above.

Figure 6:
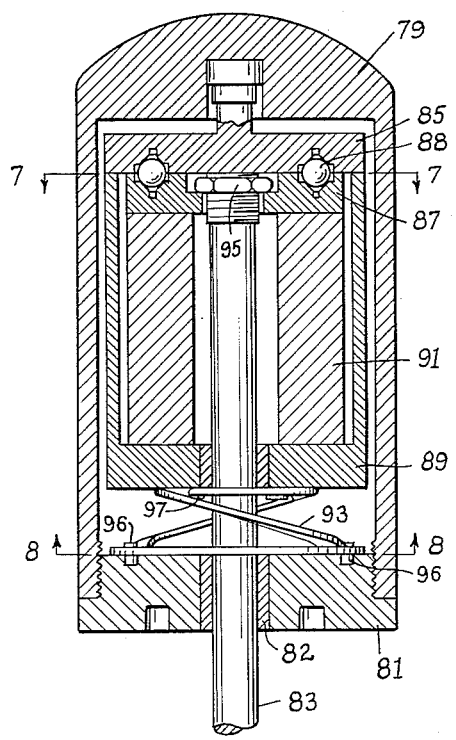
Fig. 6 is another view also similar to Fig. 1 showing a third embodiment of the invention.
Figure 7:
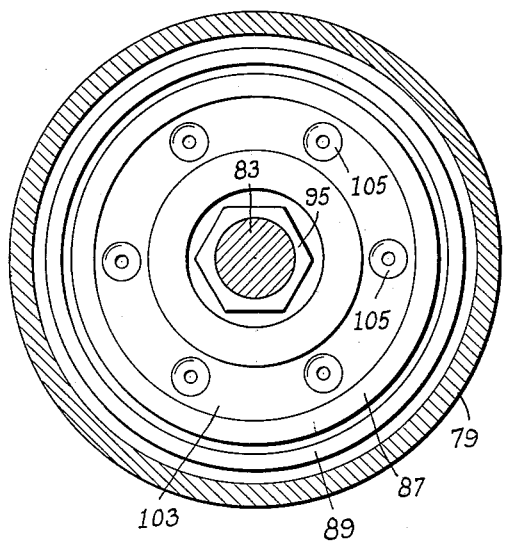
Fig. 7 is a cross section taken substantially on the line 7—7 of Fig. 6.

A third embodiment of this invention is illustrated in Figs. 6 to 9, inclusive. Referring to Fig. 6, this embodiment comprises an outer shell or case 79 which is adapted to be driven. In this instance, the case 79 is formed in the shape of an ordinary screwdriver handle adapted to be driven by hand. A rigid plate 81 is threadedly fastened to the bottom of the case 79 and contains a bearing 82 to receive a screwdriver shank 83 which is rotably mounted in the case 79.

Figure 8:
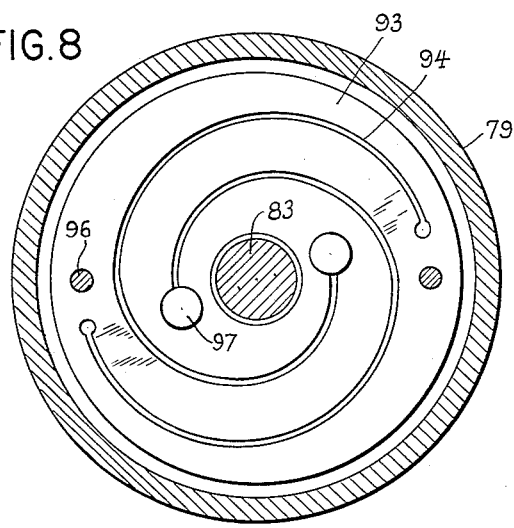
Fig. 8 is a section substantially on the line 8—8 of Fig. 6.
Figure 9:
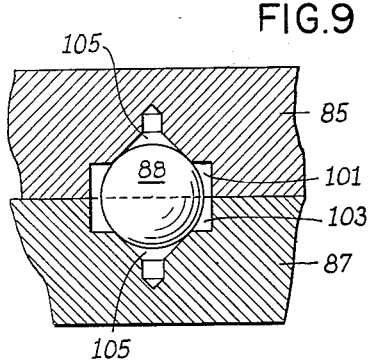
Fig. 9 is a detailed section on a larger scale showing one of the balls and the ball races near the upper part of Fig. 6.

Within the case 79, a radially extending indented disk 85 is integral with or rigidly fastened to the shank 83. Below this disk 85 is a second and somewhat similar disk 87 which, however, is not directly connected to the shank 83 but has a central opening allowing clearance around the shank so that the latter may turn relative to the disk 85. A plurality of balls 88 is interposed between the disks 85 and 87. The disk 87 is in a cup-shaped metallic member 89 which is also slidably mounted on the shank 83. A strong permanent magnet 91 is mounted within the cup 89 in contact with the disk 87, for purposes hereinafter to be described. A torque-transmitting member 93, capable of axial compression and elongation, has its lower end non-rotatably fixed to the disk 81 by the pins 96, and its upper end non-rotatably fixed to the member 89 by the pins or studs 97. This torque-transmitting or torque-coupling member 93 is formed by cutting spiral slots 94 in a disk of sheet metal, as shown in Fig. 8. The arms of the member 93 are relatively wide in a radial direction and relatively thin in an axial direction so that they are rigid in a rotational direction, but flexible in an axial direction. This construction enables the member 93 to transmit torque from the plate 81 to the cup 89 while allowing the cup 89 to move freely in an axial direction. If desired, the member 93 may be made of springy metal so as to exert some upward force on the member 89, to assist the attraction of the magnet 91. It is preferred, however, to make the member 93 of substantially non-resilient flexible metal, so that it exerts substantially no axial force when displaced axially.

The balls 88 are located in ball races 101 and 103, formed as circular grooves of rectangular cross section in the respective lower and upper faces of the respective disks 85 and 87. At circumferentially spaced intervals around these grooves, the ball-receiving depressions or dents 105 are formed in the otherwise smooth bottom surfaces of the grooves. These depressions are here shown as conical bores formed by a center drill of the familiar type used to drill a center hole in a work piece to be turned on a lathe, and this is a very convenient and economical way of making the depressions in the previously formed grooves 101 and 103. They can, of course, be milled in the bottoms of the grooves, in which case they are preferably formed with the easy entrance and steeper exit features described in connection with Fig. 4. Or, they can be formed by pressing a hardened plunger or die of the required shape against the disk 85 or 87 where the indentation is to be made, this method also being useful in forming the indentations 49, 51, 53 previously described. Whatever be the exact form of the depressions, the side walls of the grooves 101 and 103 act to retain the balls against displacement in a direction radial to the axis of rotation of the parts, so that no cage bar or cage ring is needed for this purpose, although a very thin cage ring may be used to keep the balls properly spaced in a circumferential direction, if desired.

This embodiment operates in a manner very similar to the first embodiment described above. The torque applied to the case 79 is transmitted to the plate 81, and thence through the spring 93 to the cup 89 and the disk 87. The torque is transmitted from the disk 87 to the balls 88, and thence to the disk 85 and through the shank 83 to the tool to be driven. However, in this embodiment, the magnet 91 serves as the principal force holding the disks 87 and 85 in proximity, and resisting the axial forces caused by the camming action of the balls 88, although spring 93 may be designed to assist in this function. When the torque becomes so great that the camming action of the balls 88 forces the disks 85 and 87 apart, the break is clean and crisp. This is due to the fact that magnetic forces vary with the square of the distance between magnetized bodies, and thus when the camming action of the balls becomes great enough to separate the plates 85 and 87 a very small amount, the magnetic force opposing the separation is appreciably diminished, so the remaining separation takes place rapidly.

The release torque may be adjusted in this embodiment by either adjusting the power of the magnet 91 or by varying the distance between the magnet 91 and the disk 85, which acts in effect as an armature to complete the magnet circuit. This adjustment of distance may be accomplished by providing a flanged nut 95, threadedly mounted on the shank 83 and engaging the disk 87. When the nut 95 is moved downwardly as viewed in Fig. 6, the disk 87 and the magnet 91 are moved away from the disk 85, which decreases the magnetic attraction between these parts, reducing the release torque.

It may be mentioned that in the particular construction illustrated, the magnetic circuit is quite efficient, and there is little loss from stray flux. The disks 85 and 87, and the cup-shaped holder 89, are all made of material which is magnetic (i.e., iron or steel) but not permanently magnetized. Therefore, the flux from the permanent magnet 91 goes through a path or magnetic circuit which has no substantial gaps of air spaces in it, taking an elliptical path roughly vertically through the axial length of the magnet and the axial length of the cylindrical part of the holder 89, and curving roughly horizontally through the thick bottom of the holder 89 and through the plates 87 and 85, the latter acting, in effect as an armature to complete the magnetic circuit. In the position of adjustment for transmitting maximum torque, the plate 85 is spaced very close to the plate 87, being separated from it only by a space of a few thousandths of an inch, just sufficient to prevent these parts from actually rubbing on each other, thus providing little resistance to the magnetic flux.

It is also contemplated that this embodiment could be modified by making the indentations directly in the magnet 91, and eliminating the separate disk 87. This construction has the advantage of shortening the flux path, increasing the efficiency of the magnet, and thereby permitting the use of a smaller magnet. Such a construction subjects the magnet to some wear, but this is not serious if the magnet be one of the recently developed ceramic magnets, which are quite hard.

Figure 10:
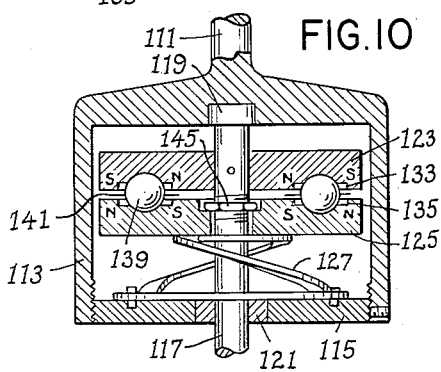
Fig. 10 is a fragmentary diagrammatic section taken diametrically through another embodiment of the invention.

Such an arrangement (placing the indentations directly in the magnet) is illustrated in Fig. 10, which figure illustrates also the further possible variation of using two magnets rather than one and using magnets which are magnetized in an annular pole pattern.

The driving shank 111 is operatively connected to a hollow cup-shaped body 113, the forward end of which is closed by a removable plate 115 which, however, is held in fixed position during operation. The driven shaft 117 is journaled rotatably in the members 113 and 115 by bearings 119 and 121, respectively, arranged so that the shaft 117 rotates concentrically with the shaft 111 but is not axially movable relative thereto.

The first disk-like magnet member 123 is fixed to the shaft 117. The second disk-like magnet member 125 is free to move both axially and rotationally relative to the shaft 117. It is held against rotation relative to the members 113 and 115 by the flexible coupling 127 made of axially flexible spiral strips of sheet metal, substantially the same as the flexible coupling 93 previously described in connection with Figs. 6 and 8. This coupling connects the inner face of the plate 115 to the adjacent face of the second magnet member 125, in a manner which is substantially rigid or unyielding in a rotational direction but freely flexible in an axial direction, and has little or no springiness or tendency to exert any axial force when displaced axially.

An annular groove or ball race 133 is formed in the lower face of the magnet member 123, and a similar groove or ball race 135 is formed in the upper face of the magnet member 125. As in the previous embodiments, depressions or ball sockets are formed in the bottoms of the grooves 133 and 135, to receive balls 139 which will thus form a driving connection between the two members 123 and 125 when the balls are seated in the depressions. These depressions are preferably formed with the shape of the depressions 49 shown in Fig. 4, having no flat bottoms but having easy or gradual concave entrance curves and steeper or more abrupt concave exit curves which, however, preferably have a radius a little greater than that of the balls themselves. Where the entrance and exit ends of the depressions or recesses join the flat surfaces between successive recesses, they are slightly rounded off in small-radius convex curves. The grooves 133, 135 serve to hold the balls 139 in proper alinement with the depressions in a radial direction. A relatively thin annular cage ring 141 embraces the balls loosely and holds them in proper alinement in a circumferential direction; that is, holds them at a proper uniform circumferential spacing equal to the uniform circumferential spacing of the ball-receiving depressions, so that if the balls have been rolling on the flat surfaces between depressions, all of the balls will simultaneously reach their next respective depressions and all will drop into their respective depressions at once.

The two magnet members 123 and 125 are both of the sintered metal kind called "Alnico" magnets, or alternatively of the kind called ceramic magnets. Both of these kinds of magnets are known in the art. Although these magnets, and particularly the ceramic ones, are extremely hard, it is known that they can be formed of the desired ball-receiving shape (e.g., by applying to a flat-ground surface of the magnet a suitably shaped die subjected to ultrasonic high frequency vibrations, according to the known techniques used in ultrasonic grinding, so as to form the ball races and the ball-receiving depressions) and they can be magnetized according to any desired pattern. According to the invention embodiment now being described, the two magnet members are magnetized with annular poles on the faces thereof which are faced toward each other, there being both an annular north pole and an annular south pole on each of such faces, with the annular poles of one magnet member directly opposite the respective annular poles of opposite sign on the other magnet member, thus producing maximum magnetic attraction for magnets of given size, and attraction which does not vary in magnitude when one magnet is rotated relative to the other, so long as they remain at a constant distance from each other.

For example, the magnet member 123 may be magnetized with an annular north pole concentric with the shaft 117 and in a location radially inside the ball race groove 133 (as indicated by the letter N in this location) and an annular south pole also concentric with the shaft 117 but at a different radial distance from the shaft, as indicated by the letter S near the outer edge of the magnet. The other magnet member 125 may be oppositely magnetized with an annular south pole opposite the north pole of the member 123, and an annular north pole opposite the south pole of the member 123, as indicated by the respective letters S and N on the member 125. The manner of magnetizing magnets in this way is known in the art relating to the making of ceramic magnets, and need not be described here.

The mode of operation of this form of the invention is in accordance with the same principles previously described. When torque is applied to the shaft 111, the torque is transmitted through the members 113 and 115 and the flexible coupling 127 to the magnet member 125. So long as the balls 139 remain seated in their respective depressions in both magnet members, the torque is transmitted from the member 125 through the balls 139 to the magnet member 123 and shaft 117. When the resistance to turning the shaft 117 becomes too great, the camming force exerted by the balls on the magnet member 125 overcomes the magnetic force tending to draw the magnet member 125 toward the magnet member 123, so that the magnet member 125 moves axially away from the member 123 and the balls can roll on the flat surfaces between the ball sockets or depressions, thus transmitting no further torque until the balls roll around to seat once more in the respective next depressions, whereupon the same disconnecting action is repeated if the original driving force is still exerted on the shaft 111. As mentioned in connection with a previous embodiment, the "break" or opening action of the clutch is particularly speedy and clean, because it involves a separation of the magnets which immediately produces a decrease in the attractive force of the magnets.

A spacer collar 145 may be adjustably mounted on the shaft 117, to determine the spacing of the magnet members 123 and 125 from each other when they are in torque-transmitting position. By varying the position of this collar, the degree of torque at which the clutch will open may be adjusted. This feature is similar to the corresponding adjustment feature described in connection with Fig. 6.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A torque control mechanism for limiting the torque transmitted from a driving member to a driven member, said mechanism comprising an outer case rigidly attached to one of said members, an axially extending shank rotatably mounted in said outer case and constituting part of the other of said members, axially spaced first and second disks having matching indentations, balls interposed between said disks and extending into said indentations, said first disk being rigidly attached to said shank, said second disk being mounted for axial and rotational movement relative to said shank, and spring means comprising a plurality of opposed Belville springs interposed between said outer case and said second disk, said spring means urging said second disk toward said first disk to tend to hold said balls in the respective indentations of both disks to form a torque-transmitting coupling between the two disks, said spring means also serving to transmit torque from said case to said second disk, said balls being displaceable from said indentations by compressing said spring means to separate the two disks farther from each other in an axial direction when the torque exceeds a predetermined value, all parts of said spring means which move axially during axial flexure of said spring means being free of all axially stationary parts so that there is no rubbing friction with axially stationary parts to impede axial flexure of said spring means.

2. A torque control mechanism for limiting the torque transmitted from a driving member to a driven member, said mechanism comprising an outer case rigidly attached to one of said members, an axially extending shank rotatably mounted in said outer case and constituting part of the other of said members, axially spaced first and second disks having matching indentations, balls interposed between said disks and extending into said indentations, said first disk being rigidly attached to said shank, said second disk being mounted for axial and rotational movement relative to said shank, and a plurality of Belville springs interposed between said outer case and said second disk for resiliently urging said second disk toward said first disk, said springs having interlocking tabs and notches for transmitting torque from said case to said second disk, all parts of said springs which move axially during axial flexure of said springs being free of all axially stationary parts so that there is no rubbing friction with axially stationary parts to impede axial flexure of said springs.

3. A construction as specified in claim 2, wherein each of said Belville springs comprises a dished central portion, a cylindrical edge portion, and a radial extending flange on said cylindrical portion.

4. Torque transmitting means for connecting one member to another while resiliently resisting movement of the members toward each other in the direction of the torque axis, said means comprising a member of resilient metal having a dished portion of approximately circular outline, teeth near the center of said dished portion for interlocking non-rotatably with one member, an approximately cylindrical flange integral with and surrounding said dished portion, an annular radial flange integral with and extending radially outwardly from the end of said cylindrical flange which is remote from said dished portion, and teeth formed in said annular flange by notching and bending portions of said annular flange, said cylindrical flange serving as a guard to stop progress of cracks originating from the notches of said annular flange as a result of repeated flexure of said dished portion.

5. Torque transmitting means for connecting one member to another while resiliently resisting movement of the members toward each other in the direction of the torque axis, said means comprising a member of resilient metal having a dished portion of approximately circular outline, teeth near the center of said dished portion for interlocking non-rotatably with one member, an approximately cylindrical flange integral with and surrounding said dished portion, an annular radial flange integral with and extending radially outwardly from the end of said cylindrical flange which is remote from said dished portion, and means formed in said annular flange for interlocking non-rotatably with another member.

References Cited in the file of this patent

UNITED STATES PATENTS

| | | |
|---|---|---|
| 2,587,712 | Dodge | Mar. 4, 1952 |
| 2,683,362 | Bowman | July 13, 1954 |
| 2,708,110 | Clay | May 10, 1955 |
| 2,802,354 | Bohnhoff et al. | Aug. 13, 1957 |
| 2,806,366 | Woestemeyer | Sept. 17, 1957 |

FOREIGN PATENTS

| | | |
|---|---|---|
| 780,057 | Great Britain | July 31, 1957 |
| 937,859 | Germany | Jan. 19, 1956 |